United States Patent
Ozawa

(10) Patent No.: US 10,968,357 B2
(45) Date of Patent: *Apr. 6, 2021

(54) TRANSFER-PRINTING INK AND TRANSFER-PRINTING APPARATUS

(71) Applicant: KYOCERA Document Solutions Inc., Osaka (JP)

(72) Inventor: Yoshio Ozawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 313 days.

This patent is subject to a terminal disclaimer.

(21) Appl. No.: 16/002,902

(22) Filed: Jun. 7, 2018

(65) Prior Publication Data

US 2018/0362786 A1    Dec. 20, 2018

(30) Foreign Application Priority Data

Jun. 15, 2017 (JP) ............................ JP2017-117947
Feb. 28, 2018 (JP) ............................ JP2018-034303

(51) Int. Cl.

| C09D 11/322 | (2014.01) |
| C09D 11/38  | (2014.01) |
| D06P 5/24   | (2006.01) |
| C09D 11/104 | (2014.01) |
| C09D 11/107 | (2014.01) |
| B41F 16/02  | (2006.01) |
| D06P 1/645  | (2006.01) |

(Continued)

(52) U.S. Cl.
CPC ............ *C09D 11/322* (2013.01); *B41F 16/02* (2013.01); *C09D 11/102* (2013.01); *C09D 11/104* (2013.01); *C09D 11/106* (2013.01); *C09D 11/107* (2013.01); *C09D 11/326* (2013.01); *C09D 11/38* (2013.01); *D06P 1/44* (2013.01); *D06P 1/5221* (2013.01); *D06P 1/5257* (2013.01); *D06P 1/5271* (2013.01); *D06P 1/5285* (2013.01); *D06P 1/5292* (2013.01); *D06P 1/645* (2013.01); *D06P 5/007* (2013.01); *D06P 5/30* (2013.01)

(58) Field of Classification Search
None
See application file for complete search history.

(56) References Cited

U.S. PATENT DOCUMENTS

| 5,640,180 A * | 6/1997 | Hale ................. B41F 16/02 |
|  |  | 347/103 |
| 5,641,346 A * | 6/1997 | Mantell ................ C09D 11/36 |
|  |  | 106/31.58 |

(Continued)

FOREIGN PATENT DOCUMENTS

| JP | 2006-207101 A | 8/2006 |
| JP | 2010-64354 A  | 3/2010 |

(Continued)

*Primary Examiner* — Helene Klemanski
(74) *Attorney, Agent, or Firm* — Stein IP, LLC

(57) ABSTRACT

A transfer-printing ink contains a pigment and a fixing resin. The mass ratio of the pigment to the fixing resin is 1:1 to 1:5, and the ink has a viscosity of 3 mPas to 10 mPas at 23° C. The ink is ejected onto a transfer paper base by an ink-jet recording device when transfer paper is prepared. The ink is then transferred from the transfer paper to cloth as a result of the transfer paper, with the cloth laid over it, being heated.

8 Claims, 2 Drawing Sheets

(51) Int. Cl.
  *D06P 1/52*   (2006.01)
  *C09D 11/326*  (2014.01)
  *C09D 11/102*  (2014.01)
  *C09D 11/106*  (2014.01)
  *D06P 1/44*   (2006.01)
  *D06P 5/30*   (2006.01)

(56) References Cited

U.S. PATENT DOCUMENTS

| | | | | |
|---|---|---|---|---|
| 6,036,808 | A * | 3/2000 | Shaw-Klein | B41M 5/0355 |
| | | | | 347/105 |
| 6,139,672 | A * | 10/2000 | Sato | B41M 5/0256 |
| | | | | 156/235 |
| 6,540,345 | B1 * | 4/2003 | Wagner | B41J 2/01 |
| | | | | 347/103 |
| 10,421,270 | B2 * | 9/2019 | Kuwahara | C09D 11/106 |
| 10,507,643 | B2 * | 12/2019 | Ozawa | D06P 1/5221 |
| 2012/0306976 | A1 | 12/2012 | Kitagawa et al. | 347/100 |
| 2015/0116414 | A1 * | 4/2015 | Eliyahu | B41J 2/2107 |
| | | | | 347/20 |
| 2015/0119486 | A1 * | 4/2015 | Belelie | C09D 11/101 |
| | | | | 522/18 |
| 2015/0337153 | A1 * | 11/2015 | Oguchi | C09D 11/40 |
| | | | | 428/195.1 |
| 2016/0230030 | A1 * | 8/2016 | Tominaga | C09D 11/38 |
| 2018/0297355 | A1 * | 10/2018 | Kuwahara | C09D 11/30 |
| 2018/0361768 | A1 * | 12/2018 | Ozawa | B41M 5/0256 |
| 2018/0362787 | A1 * | 12/2018 | Ozawa | D06P 1/5271 |
| 2019/0061401 | A1 * | 2/2019 | Ozawa | B41M 5/0256 |

FOREIGN PATENT DOCUMENTS

| | | |
|---|---|---|
| JP | 2012-251062 A | 12/2012 |
| JP | 2016-190930 A | 11/2016 |

\* cited by examiner

TRANSFER-PRINTING INK AND TRANSFER-PRINTING APPARATUS

INCORPORATION BY REFERENCE

This application is based on and claims the benefit of Japanese Patent Applications No. 2017-117947 filed on Jun. 15, 2017 and No. 2018-34303 filed on Feb. 28, 2018, the contents of both of which are hereby incorporated by reference.

BACKGROUND

The present disclosure relates to transfer-printing ink that is ejected onto transfer paper by an ink-jet recording device and that is then transferred to a recording sheet. The present disclosure relates also to a transfer-printing apparatus.

Conventionally, screen printing, roller printing, and the like are widely used as methods for printing on cloth such as cotton, silk, and polyester. These printing methods require different screen frames, engraved rollers, and the like for different print patterns, and are thus unsuitable for printing in small-volume large-variety production. They also require the washing-away of a sizing agent and the like, and produce large amounts of waste water, posing a problem of increased burden on the environment. In contrast, ink-jet printing does not require pattern-making for screen frames or engraved rollers, and allows change of print patterns and colors simply through change of digital data; it is thus suitable for small-volume large-variety production. Also, ink-jet printing produces far less waste water. It has thus come to be used increasingly widely today.

Known ink-jet printing methods include a direct printing method, in which an image is printed directly on cloth on an ink-jet printer, and a transfer printing method, in which an image is printed on special paper (transfer paper) on an ink-jet printer and then only the ink on the transfer paper is transferred to cloth on a thermal transfer device.

In a direct printing method, an image is printed while cloth is transported at high speed; thus, bringing an ink-jet head too close to the cloth causes, due to fluff on the surface of the cloth, wear and scratches on the ink-jet head. Thus, a given distance has to be left between the ink-jet head and the cloth. Inconveniently, a greater distance between the ink-jet head and the cloth tends to lead to a disturbed image, and cloth having an image printed inappropriately on it has to be scrapped.

On the other hand, a transfer printing method has, to name a few, the following advantages. The absence of a step involving direct transport of cloth to a printer makes a disturbed image less likely, and allows high-quality, high-definition printing of images on cloth. Owing to image printing using an ink-jet printer being performed on transfer paper, an inappropriately printed image does not require scrapping of cloth. Only a comparatively small distance has to be left between an ink-jet head and transfer paper, and this allows high-quality image printing with little contamination with ink mist.

One commonly practiced type of such transfer printing method is a sublimation printing method employing a sublimation dye. For example, one known type of sublimation ink-jet printing transfer paper has, on a base material, a sublimation printing ink reception layer containing a water-soluble resin and fine particles, and this design gives it superb ink absorption, drying speed, image reproduction, and resistance to striking-through.

Inconveniently, a sublimation printing method has, to name a few, the following disadvantages. It can be applied only to polyester fiber. Due to low molecular weights, some sublimation dyes have poor light-fastness, and their colors can migrate or fade during washing or under the heat of an iron. Due to high transfer temperatures, fiber can be compressed during transfer, leading to a degraded feel.

Against the background discussed above, there have been developed printing techniques that employ non-sublimation pigment ink and that can be applied to a wide range of fibers other than polyester fiber. For example, one known type of ink-jet printing ink is an ink composition containing a dispersion of a pigment with an average particle diameter of 200 μm or less and a maximum particle diameter of 500 μm or less, a water-soluble fixing agent, and a cross-linking agent, wherein a water-soluble pigment dispersing agent is obtained by neutralizing a particular emulsion polymer with a basic substance, the water-soluble fixing agent has a cross-linking functional group, and the cross-linking agent has a functional group that starts a cross-linking reaction with the cross-linking functional group of the water-soluble pigment dispersing agent and the cross-linking functional group of the water-soluble fixing agent at a temperature of 100° or higher.

For another example, one known type of ink-jet pigment printing ink is a pigment printing ink containing a pigment, water, and a water-soluble organic solvent, wherein the pigment is dispersed by a pigment dispersing agent, and the pigment dispersing agent is neutralized with a volatile amine and an inorganic base. For yet another example, a known transfer-printing method involves printing a pattern by ink-jet printing using a water-soluble dye on transfer paper coated with a hydrophilic sizing agent as an ink reception layer and then transferring the pattern to cloth containing a natural fiber as a main component.

SUMMARY

According to one aspect of the present disclosure, a transfer-printing ink contains a pigment and a fixing resin. The mass ratio of the pigment to the fixing resin is 1:1 to 1:5, and the ink has a viscosity of 3 mPas to 10 mPas at 23° C. The transfer-printing ink is ejected onto a transfer paper base by an ink-jet recording device when transfer paper is prepared. The transfer-printing ink is then transferred from the transfer paper to cloth as a result of the transfer paper, with the cloth laid over it, being heated.

This and other objects of the present disclosure, and the specific benefits obtained according to the present disclosure, will become apparent from the description of embodiments which follows.

DETAILED DESCRIPTION

Figure 1A:
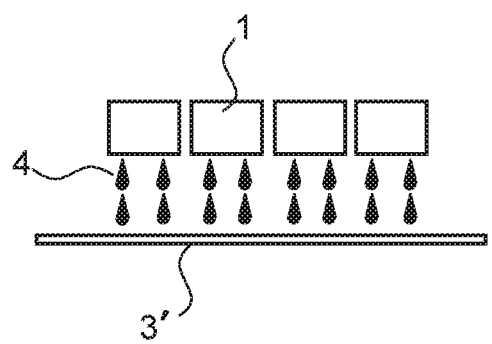
FIG. 1A is a diagram schematically showing a transfer paper preparing step (an image printing step) in a transfer-printing method according to the present disclosure.

A transfer-printing method according to the present disclosure involves first forming an image on transfer paper with non-sublimation transfer-printing ink on an ink-jet printer, then laying the transfer paper having the image formed on it on cloth (such as woven fabric or knit fabric), and then applying at least heat and pressure so that the transfer-printing ink is transferred to the cloth. The transfer-printing ink contains a pigment and a fixing resin. The fixing resin does not cross-link on the transfer paper. The fixing resin cross-links when heated for transfer to the cloth, and it then bonds to the fiber of the cloth, providing enhanced adhesion of the image to the cloth.

Transfer-printing ink is required to have landing stability when ejected at high speed onto transfer paper. Transfer paper is required to have a releasing capability to allow transfer-printing ink to move onto cloth when an image is transferred to the cloth. Moreover, for satisfactory adhesion of the image to the cloth, the added amount of fixing resin relative to the pigment needs to be increased. On the other hand, for satisfactory high-speed ejection out of ink-jet nozzles, it is necessary not to increase the ink viscosity over a certain level. That is, it is important to adjust the blended amount of fixing resin relative to the pigment in an adequate range. The transfer-printing ink used in a transfer-printing method according to the present disclosure will now be described.

Pigment: As the pigment blended in the transfer-printing ink, any of conventionally known organic and inorganic pigments can be used. Examples include: azo pigments such as azo lakes, insoluble azo pigments, condensed azo pigments, and chelate azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes and acid dye lakes; organic pigments such as nitro pigments, nitroso pigments, aniline black, daylight fluorescent pigments; and inorganic pigments such as carbon black. The pigment content of the ink is, preferably, 0.5 to 10% by mass.

With the pigment blended in the transfer-printing ink according to the present disclosure, considering that the pigment transferred to cloth is present near the surface of the cloth, it is important to reduce the particle diameter of the pigment particles to obtain enhanced color richness. Specifically, the average particle diameter of the pigment particles is 30 nm to 150 nm, and preferably 50 nm to 100 nm. An average particle diameter larger than 100 nm results in subdued color richness, and this leads to a reduced density of the printed article, making it impossible to obtain a sharp image.

On the other hand, with the average particle diameter of the pigment particles equal to or smaller than 50 nm, they tend to show low dispersion stability in the ink. The pigment may then flocculate, causing clogged ink-jet nozzles. To avoid that, in the pigment particles blended in the transfer-printing ink, it is preferable that the pigment particles be dispersed in the ink by a dispersion stabilizer or by the fixing resin that is present as a coating material, of which both will be described later. The average particle diameter of the pigment particles can be measured with a commercially available particle diameter measuring instrument employing a light scattering method, an electrophoresis method, a laser Doppler method, or the like. Measurement is also possible by taking images of at least 100 particles on a transmission electron microscope and then performing statistical processing using image analysis software.

Specific examples of the pigment blended in the transfer-printing ink are as follows. Examples of magenta or red pigments include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of orange or yellow pigments include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, and C.I. Pigment Yellow 138.

Examples of green or cyan pigments include: C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Fixing Resin: It is preferable that the transfer-printing ink according to the present disclosure have, in addition to stability as ink, releasability from transfer paper and adhesion stability to cloth. It is preferable that the fixing resin blended in the transfer-printing ink be a water-dispersible resin that is insoluble in water. A water-dispersible resin is comparatively oil-soluble, and can be fixed so as to coat the entire pigment that has moved onto cloth; it thus allows the pigment to adhere to the cloth more firmly. In the present disclosure, it is important to bring the fixing resin into the most stable state with respect to water by neutralizing it with a base.

Examples of water-dispersible resins usable in the present disclosure includes: styrene-acrylic resin, silicone resin, polyester resin, and polyurethane resin; and copolymers having two or more of the just-named resins polymerized together, such as a copolymer of styrene-acrylic resin with polyester resin and a copolymer of styrene-acrylic resin with urethane resin. Any two or more of these water-dispersible resins can be used in a mixture. Moreover, it is important to use a design that allows, during transfer to cloth, part of the fixing resin to cross-link and bond firmly to the cloth to cause an increase in molecular weight or a hardening reaction. Accordingly, it is possible to use, as the fixing resin, any, having a reactive functional group, of a water dispersion of an acrylic monomer and polyisocyanate, a water dispersion of block polyisocyanate, and a water dispersion of glyoxal resin; or a copolymer containing some other cross-linking agent.

Increasing the added amount of the fixing resin with a view to increasing the adhesion stability of the ink to cloth makes the cloth having an image transferred to it less flexible, giving it a coarse and hence degraded feel. To avoid that, it is preferable to use a resin, such as polyurethane resin, that has such a molecular structure as to retain flexibility after hardening.

As styrene-acrylic resin, it is possible to use a combination of one or more selected from the group consisting of styrene-(meth)acrylic acid copolymers and styrene-(meth)acrylic acid-(meth)acrylic acid ester copolymers. Examples of (meth)acrylic acid esters usable include benzyl (meth) acrylate, cyclohexyl (meth)acrylate, methyl (meth)acrylate, ethyl (meth)acrylate, propyl (meth)acrylate, butyl (meth) acrylate, hexyl (meth)acrylate, octyl (meth)acrylate, lauryl (meth)acrylate, 2-ethylhexyl (meth)acrylate, 2-ethylhexyl-carbitol (meth)acrylate, EO-modified phenol (meth)acrylate, isobornyl (meth)acrylate, dicyclopentenyl (meth)acrylate, dicyclopentanyl (meth)acrylate, and dicyclopentenyloxy-ethyl (meth)acrylate.

Examples of silicone resin usable includes modified silicone oils of a side-chain type, a single-terminal type, a double-terminal type, a side-chain double-terminal type, and the like.

Examples of polyester resin usable include ester-bond polymers—including block copolymers, random copolymers, graft copolymers, and the like of such polymers—of a divalent carboxylic acid, such as terephthalic acid, isophthalic acid, orthophthalic acid, 2,6-naphthalenedicarboxylic acid, sulfoisophthalic acid, succinic acid, adipic acid, azelaic acid, sebacic acid, 1,10-decanedicarboxylic acid, or dimer acid, or a trivalent or higher-valence polyvalent carboxylic acid, such as trimellitic acid or pyromellitic acid, with a divalent alcohol, such as ethylene glycol, 1,2-propylene glycol, 1,3-propylene glycol, 1,4-butanediol, 1.5-pentanediol, 1,6-hexanediol, 1,9-nonanediol, neopentyl glycol, 3-methyl-1,5-pentanediol, diethylene glycol, triethylene glycol, polytetraethylene glycol, 1,4-cyclohexanedimethanol, or ethylene oxide-added bisphenol A, or a trivalent or higher-valence polyvalent alcohol, such as trimethylolpropane or pentaerythritol.

Examples of urethane resin usable include urethane-bond polymers—including block copolymers, random copolymers, graft copolymers, and the like of such polymers—of a polyol, such as polypropylene glycol, polyethylene glycol, polytetramethylene glycol, poly(ethylene adipate), poly(diethylene adipate), poly(propylene adipate), poly(tetramethylene adipate), poly(hexamethylene adipate), poly-ϵ-caprolactone, poly(hexamethylene carbonate), or silicone polyol, with an isocyanate, such as trilene diisocyanate, 4,4-diphenylmethane diisocyanate, xylyrene diisocyanate, naphthalene diisocyanate, hexamethylene diisocyanate, hydrogenated trilene diisocyanate, hydrogenated 4,4-diphenylmethane diisocyanate, isophorone diisocyanate, or tetramethylxylyrene diisocyanate.

In the transfer-printing ink according to the present disclosure, the fixing resin may be present as a coating material around the pigment particles, or may be added as latex particles to the ink.

In a case where the fixing resin is made to be present as a coating material around the pigment particles, the pigment particles are dispersed in a polymer solution obtained by solution polymerization of a monomer so as to be subjected to phase-changing emulsification into an aqueous phase. This produces transfer-printing ink that is stable and in which the coated particles exhibit a sharp particle size distribution. It is preferable, from the perspectives of the storage stability and color richness of the ink, that the average particle diameter of the coated particles coated by the fixing resin be about 80 to 150 nm.

In a case where the fixing resin is added as latex particles to the ink, a pigment and a dispersion stabilizer are mixed and dispersed to prepare a dispersion of the pigment beforehand. The obtained dispersion of the pigment is then blended with latex along with other components such as a neutralizer, a solvent, and water to prepare transfer-printing ink.

A typical example of the latex added to the transfer-printing ink is a polyurethane latex. Polyurethane latices include those obtained by adding an emulsifier to, and thereby emulsifying, an ordinary comparatively hydrophilic polyurethane resin and self-emulsifying emulsions having a functional group acting as an emulsifier introduced in a resin itself by a means such as copolymerization. Anionic self-emulsifying polyurethane emulsions usable in the ink according to the present disclosure belong to the latter. In terms of the adhesion and dispersion stability of the pigment, and in view of different combinations with dispersing agents, polycarbonate-based polyurethane resin emulsions are effective because they retain flexibility under weakly alkaline conditions and are fast. Care should be taken, however, because they tend to flocculate under acidic conditions.

Preferred examples of polycarbonate-based polyurethane resin emulsions are those with an acid value of 40 or more but 120 or less, a molecular weight of 500 or more but 50000 or less, and an average primary particle diameter of 150 nm or less, preferably 120 nm or less, and more preferably 100 nm or less. Generally, an average primary particle diameter less than 50 nm tends to result in poor dispersion stability in water.

The fixing temperature (cross-linking temperature) of the fixing resin to cloth is 100° C. to 200° C., preferably 120° C. to 190° C., and more preferably 140° C. to 180° C. With a fixing temperature of 100° C. or lower, hardening occurs at the temperature at which the ink on the transfer paper is dried, and this makes it impossible to obtain satisfactory fastness in friction fastness tests and the like after transfer to cloth. On the other hand, with a fixing temperature of 200° C. or higher, the fiber of cloth flattens, resulting in a degraded feel.

As will be discussed later, for the transfer-printing ink transferred to cloth to turn into film requires a given amount of fixing resin. The blended amount of the fixing resin in the transfer-printing ink is such that the mass ratio of the fixing resin is 1 to 5 times that of the pigment, and preferably 1 to 3 times. With the mass ratio of the fixing resin lower than once that of the pigment, the ink cannot turn into film satisfactorily on the cloth; also, adhesion to fiber is insufficient, resulting in poor washing fastness and friction fastness. On the other hand, with the mass ratio of the fixing resin higher than 5 times that of the pigment, increased ink viscosity causes low ink ejection stability, and this makes it impossible to print stable images on transfer paper for a long period.

The acid value of the fixing resin is preferably 80 mg KOH/g or more but less than 300 mg KOH/g, and preferably 90 mg KOH/g to 250 mg KOH/g. With the acid value of the fixing resin in the just-mentioned range, the copolymer exhibits notably increased viscosity when dried, and hardens to be firmer even after drying, resulting in good fixing of the pigment. The acid values defined in the present disclosure can be measured in conformity with JIS K 0070.

The molecular weight of the fixing resin usable in the present disclosure is, in terms of average molecular weight, preferably 2000 to 3000, and more preferably 5000 to 25000. The pKa (acid dissociation constant) of the fixing resin usable is preferably 4 to 8, and more preferably 5 to 7. In a case where the fixing resin is added as latex particles, it is preferable to use a fixing resin with a pKa lower than that of the dispersion stabilizer so that, after the dispersion stabilizer of the pigment particles has lost its dispersion stability and has precipitated, the fixing resin loses its dispersion stability.

Neutralizer: The neutralizer is blended to neutralize the carboxyl groups in the fixing resin. During image formation on the transfer paper and during drying, the neutralizer remains in the ink image formed on the transfer paper, and the anionic fixing resin together with the pigment can maintain dispersion stability in the ink. Then, during image transfer to cloth, the fixing resin softens and gelates under heat, pressure, steam, and the like, allowing easy transfer of the image to the cloth. At this time, for increased hydrophobicity of the cloth, it is preferable that most of the neutralizer evaporate. Accordingly, as the neutralizer, it is particularly preferable to use a volatile amine.

A preferred volatile amine is one that has a boiling point of 50° C. or higher at ordinary pressure, is stable at ordinary temperature, and evaporates in a range of temperatures of 50° C. to 250° C. Considering that transfer to cloth can be performed at a temporarily raised vapor pressure, it is possible to use as the neutralizer an amine with a boiling point higher than 200° C. at ordinary pressure.

Examples of volatile amines usable in the present disclosure include triethylamine, 2-dimethylaminoethanol, 2-di-n-butylaminoethanol, methyldiethanolamine, 2-amino-2-methyl-1-propanol, diethanolamine, triethanolamine, and 2 methylaminoethanol. These volatile amines can be used in a mixture of two or more of them.

Water-Soluble Solvent: The transfer-printing ink according to the present disclosure contains a water-soluble solvent. The kind and the blended amount of the water-soluble solvent can be selected and adjusted appropriately from the viewpoints of adjusting ejection stability from an ink-jet printer (ink viscosity), permeability to cloth, gelation speed, and the like. It is preferable that the viscosity of the transfer-printing ink according to the present disclosure be adjusted at 3 mPas to 10 mPas at 23° C.

Examples of water-soluble solvents usable in the transfer-printing ink according to the present disclosure include: alkyl alcohols with a carbon number of 1 to 4 such as methanol, ethanol, butanol, propanol, and isopropanol; glycol ethers such as ethylene glycol monomethyl ether, ethylene glycol monoethyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, dipropylene glycol mono-n-butyl ether; propylene glycol, glycerin, formamide, acetamide, dimethylsulfoxide, sorbit, sorbitan, acetin, diacetin, triacetin, and sulfolane; and any mixture of what has just been named. The water-soluble solvent content of the transfer-printing ink is preferably 10 to 60% by mass.

As necessary, a film formation aid, a surfactant, an antiseptic, and the like can be further blended in the transfer-printing ink according to the present disclosure. The film formation aid is soluble in water and in a water-soluble solvent; it stays in the ink while water and the water-soluble solvent evaporate, and aids in forming a firm film when the fixing resin is melted and fused. Examples of film formation aids usable in the transfer-printing ink according to the present disclosure include glycol ethers with a comparatively high boiling point, such as tripropylene glycol n-butyl ether.

Transfer Paper: Next, the transfer paper used in a transfer-printing method according to the present disclosure will be described. In a conventionally common sublimation transfer method, ink is printed on transfer paper and then the pigment is sublimated under heat so that an image is transferred to cloth. This is a chemical transfer method. On the other hand, according to the present disclosure, a fixing resin needed to fix a pigment to cloth is blended in transfer-printing ink, and the fixing resin, when heated with a transferring device, softens so that the pigment is, along with the fixing resin, transferred physically to cloth. The transfer is performed under conditions involving the application of, in addition to heat as in conventional practice, pressure, vibration, steam, and the like. Thus, the transfer paper is required to have a blocking function whereby the transfer paper quickly receives the water-based transfer-printing ink while blocking it from permeating the transfer paper and a releasing function whereby the transfer paper permits release of the ink components to cloth during transfer.

For quick reception of water-based ink, the transfer paper needs to have fine irregularities formed on its surface so as to absorb the ink. To that end, it is necessary to form an ink reception layer having blended in it a hydrophilic fixing resin or fine particles of calcium carbonate, silica, or the like. On the other hand, to allow physical transfer of the transfer-printing ink according to the present disclosure, the ink releasing layer needs to have a function of releasing the ink. More specifically, transfer is achieved through the softening and gelation of the fixing resin in the ink under heat, pressure, steam, or the like during image transfer. Softening under steam can be achieved easily by letting the neutralizer in the anionic fixing resin remain until transfer. Also effective are a design in which part of the ink reception layer on the transfer paper is transferred along with the ink to cloth and a design in which the surface of the hydrophilic ink reception layer is sprayed with a hydrophobic resin such as silicone resin or wax so that a hydrophobic layer is present sparsely to facilitate release of water-based ink.

Figure 1B:
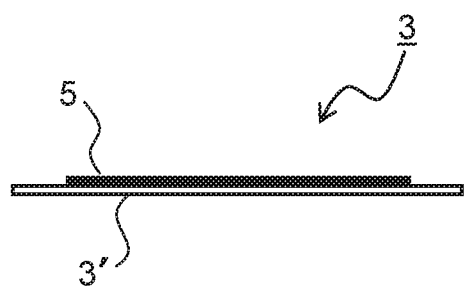
FIG. 1B is a diagram schematically showing the transfer paper preparing step (a drying printing step) in the transfer-printing method according to the present disclosure.

Next, a procedure of a transfer-printing method according to the present disclosure will be described. FIGS. 1A and 1B schematically show a transfer paper preparing step in the transfer-printing method according to the present disclosure, and FIGS. 2A and 2B show a transferring step and a releasing step, respectively, in the transfer-printing method according to the present disclosure.

As shown in FIG. 1A, using an ink-jet head 1, transfer-printing ink 4 is ejected onto a transfer paper base 3' to form an image, so that an ink layer 5 is formed. Then, as shown in FIG. 1B, the ink layer 5 is dried, so that a transfer paper 3 is prepared (transfer paper preparing step).

In the transfer paper preparing step, drying is performed at a temperature lower than the cross-linking temperature (hardening temperature) of the fixing resin contained in the ink layer 5. In a case where the ink layer 5 contains a volatile amine as a neutralizer for the fixing resin, drying is performed at a temperature equal to or lower than the boiling point of the volatile amine contained in the ink layer 5. The drying temperature is, preferably, 100° C. or lower.

Figure 2A:
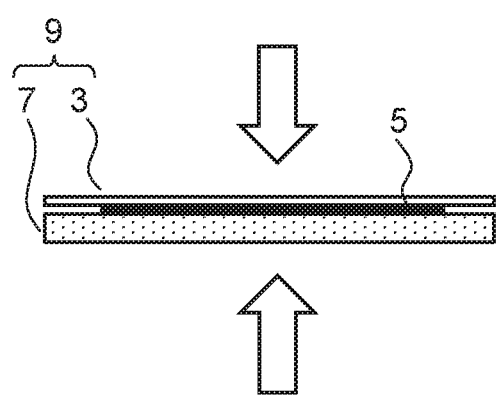
FIG. 2A is a diagram schematically showing a transferring step in the transfer-printing method according to the present disclosure.
Figure 2B:
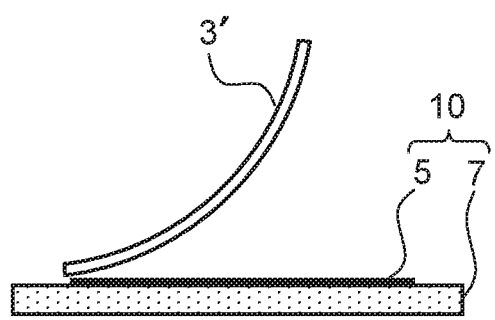
FIG. 2B is a diagram schematically showing a releasing step in the transfer-printing method according to the present disclosure.

Next, as shown in FIG. 2A, the transfer paper 3 is laid over one side of cloth 7, and the composite 9 of the cloth 7 and the transfer paper 3 thus laid together is subjected to application of pressure and heat, so that the ink layer 5 on the transfer paper 3 is transferred to the cloth 7 (transferring step).

Used as the cloth 7 is a woven fabric, knit fabric, or non-woven fabric made of one or more than two selected from the group consisting of cellulose fibers such as cotton, hemp, and rayon; protein fibers such as silk and wool; and synthetic fibers such as nylon, vinylon, and polyester.

In the transferring step, the composite 9 is heated at a temperature higher than the cross-linking temperature of the fixing resin contained in the ink layer 5. In a case where the ink layer 5 contains a volatile amine as a neutralizer for the anionic fixing resin, the composite 9 is heated at a temperature equal to or higher than the boiling point of the volatile amine. Thus, immediately after the start of transfer, the volatile amine remaining in the ink layer 5 makes the ink layer 5 hydrophilic and lets it soften (gelate). Thus, the ink layer 5 is transferred easily to the cloth 7, turning into film in close contact with the cloth 7. As the transferring step proceeds, the volatile amine evaporates, and makes the ink layer 5 hydrophobic. Thus, the ink layer 5 having turned into film attaches firmly to the cloth 7.

The heating in the transferring step causes the moisture contained in the transfer paper 3 to become steam and thereby promotes the hydrophilization (softening) of the ink layer 5. Accordingly, prior to the transferring step, a moisture-impregnating step of impregnating the cloth 7 with moisture can be added to promote the softening of the ink layer 5 and to improve the transferability of the ink layer 5 to the cloth 7.

With the heating temperature (transferring temperature) during the transferring step lower than 100° C., it is close to the drying temperature of the ink layer 5 during the transfer paper preparing step. Thus, the ink layer 5 on the transfer paper 3 hardens during drying, and the volatile amine in the ink layer 5 does not evaporate sufficiently. This leads to insufficient fastness in the friction fastness tests and the like after transfer to the cloth 7. On the other hand, with the heating temperature during the transferring step higher than 200° C., the fiber of the cloth 7 flattens, giving it a degraded feel. Accordingly, the heating temperature in the transferring step needs to be 100° C. or higher but 200° C. or lower, preferably 120° C. to 190° C., and more preferably 140° C. to 180° C.

Next, as shown in FIG. 2B, the transfer paper base 3' is released from the composite 9 (releasing step). In this way, a printed article 10 is produced that has the ink layer 5 transferred in the form of film to the cloth 7. Thereafter, as necessary, it is possible to perform a cleaning step to remove unnecessary substances in the printed article 10, such as the unfixed pigment and the fixing resin, and a drying step to dry the printed article 10 having undergone the cleaning step.

The layer thickness of the ink layer 5 transferred to the cloth 7 is preferably 50 nm to 200 nm, and more preferably 50 nm to 100 nm. With the layer thickness of the ink layer 5 equal to or larger than 500 nm, the cloth 7 feels coarse and has degraded friction fastness, and the cloth 7 has a degraded feel. Moreover, since the particle diameter of the pigment particles is typically 50 nm to 100 nm, even if part of the pigment particles lodge in the fiber of the cloth 7, the minimum value of the layer thickness is about 40 nm to 80 nm.

As a method of measuring the layer thickness of the ink layer 5 transferred to the cloth 7 and turned into film, an ion beam method as described below is used. The cloth 7 having the ink layer 5 transferred to it is embedded in a ultraviolet-curable resin, and is then irradiated with a UV lamp so that the ultraviolet-curable resin hardens; then, samples for measurement are cut out. The section of each cut-out sample is inspected on a transmission electron microscope (TEM) to measure the layer thickness of the ink layer 5. Measurements are taken at 20 observation points, and their average value is calculated.

The layer thickness of the ink layer 5 transferred to the cloth 7 is correlated with the layer thickness of the ink layer 5 formed on the transfer paper base 3'. For the ink layer 5 transferred to the cloth 7 to have a layer thickness of 50 nm to 200 nm, the ink layer 5 formed on the transfer paper base 3' can be formed with a layer thickness of 50 nm to 500 nm. The layer thickness of the ink layer 5 formed on the transfer paper base 3' can be measured by an ion beam method as with the layer thickness of the ink layer 5 transferred to the cloth 7.

Although the above description with reference to FIGS. 1 and 2 deals with a transfer-printing method of a batch type in which a composite 9 having transfer paper 3 and cloth 7 laid together is pressed from both above and below, the transfer-printing ink according to the present disclosure is applicable similarly to a transfer-printing method of a continuous type in which, while transfer paper 3 and cloth 7, both in a form continuous and wound in a roll, are fed out at predetermined speed, they are laid together to form a composite 9, then, while this is passed between a heating and a pressing roller, an ink layer 5 is transferred to the cloth 7, and then the transfer paper base 3' is released while it is would up. A transfer-printing method of a continuous type will be described below.

Figure 3:
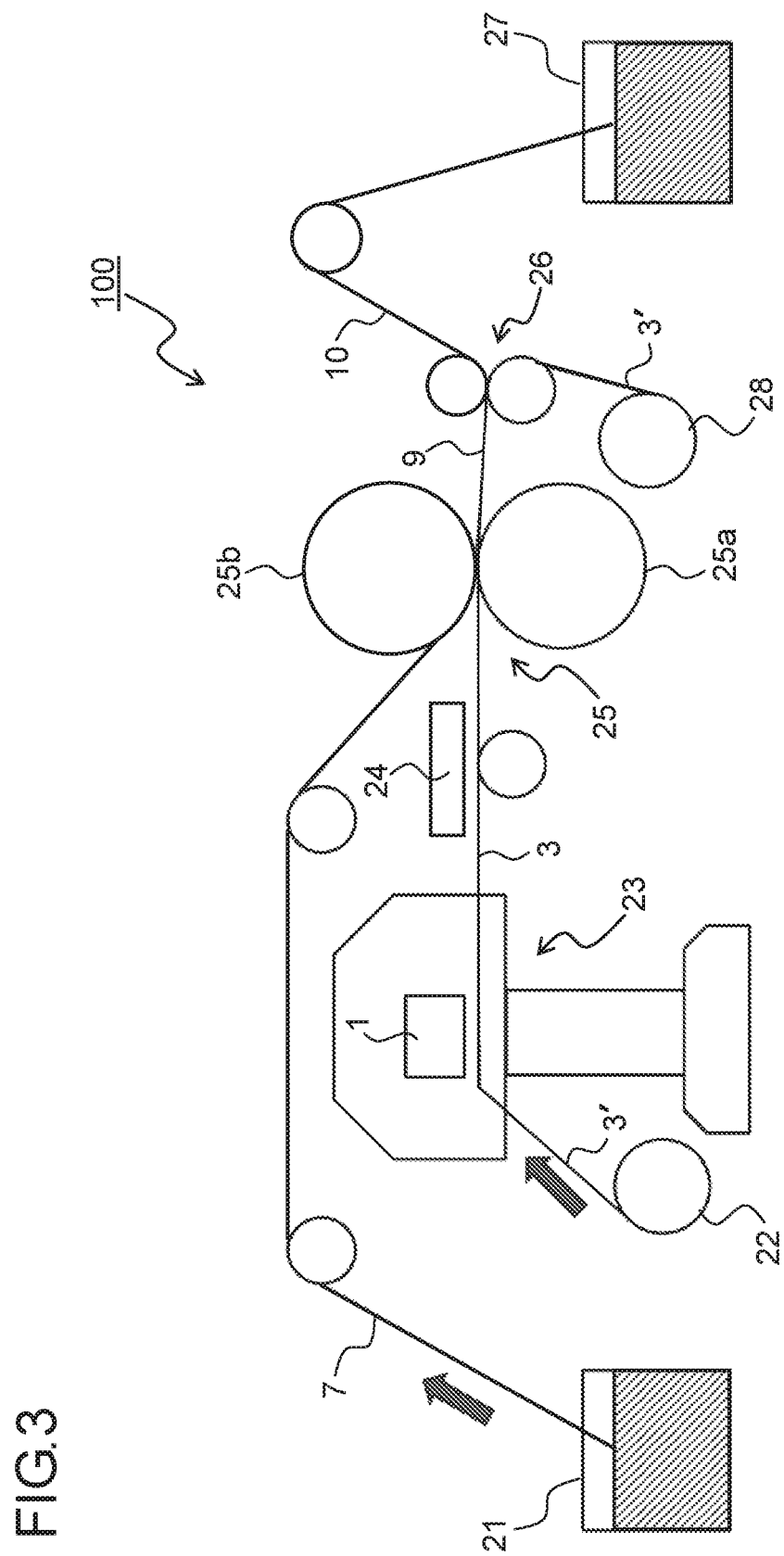
FIG. 3 is a diagram schematically showing a transfer-printing apparatus that uses transfer-printing ink according to the present disclosure.

FIG. 3 is a diagram schematically showing a transfer-printing apparatus that uses transfer-printing ink according to the present disclosure. The transfer-printing apparatus 100 is an apparatus that prints on cloth 7 by a transfer-printing method of a continuous type. As shown in FIG. 3, the transfer-printing apparatus 100 includes a cloth dispensing unit 21, a transfer paper dispensing unit 22, an ink-jet recording unit 23, a drying unit 24, a transferring unit 25, a releasing unit 26, a cloth collecting unit 27, and a transfer paper collecting unit 28.

The cloth 7, which is a continuous recording sheet, is stored in the cloth dispensing unit 21 provided on the upstream side (in FIG. 3, left side) of the ink-jet recording unit 23 in the feeding direction. The cloth dispensing unit 21 includes (though neither is illustrated) a rotary shaft on which the cloth 7 in the form of a roll is mounted and a motor which drives the rotary shaft to rotate in a predetermined rotation direction. As the motor is driven and its rotary shaft rotates, the cloth 7 is fed out to the downstream side (in FIG. 3, right side) in the feeding direction.

The transfer paper dispensing unit 22 has mounted on it a transfer paper base 3' in the form of a roll. The transfer paper base 3' is so mounted that, when it is fed out as a motor (unillustrated) is driven, the transfer surface of the transfer paper base 3' faces an ink-jet head 1 in the ink-jet recording unit 23.

The ink-jet recording unit 23, using the ink-jet head 1, prints an image and thereby forms an ink layer 5 (see FIG. 1) on the transfer paper base 3' fed out from the transfer paper dispensing unit 22, so as thereby to prepare transfer paper (transfer paper having an image formed on it) 3. The drying unit 24 is provided on the downstream side of the ink-jet recording unit 23, and dries the transfer paper 3 at a temperature lower than the cross-linking temperature of the fixing resin contained in the ink layer 5.

The transferring unit 25 includes a heating roller 25a which has a heat source in it and a pressing roller 25b which is in pressed contact with the heating roller 25a. The transfer paper 3 having an image printed on it by the ink-jet recording unit 23 and having been dried by the drying unit 24 then, in a state laid over the cloth 7 fed out from the cloth dispensing unit 21 with the image surface (ink layer 5) facing the cloth 7, passes through the nip between the heating roller 25a and the pressing roller 25b. Meanwhile, the composite 9 of the transfer paper 3 and the cloth 7 laid together is subjected to heating and pressing, so that the ink layer 5 on the transfer paper 3 is transferred to the surface of the cloth 7, producing a printed article 10. The heating by the transferring unit 25 is performed at a temperature higher than the cross-linking temperature of the fixing resin contained in the ink layer 5.

The releasing unit 26 is provided on the downstream side of the transferring unit 25. The releasing unit 26 releases the transfer paper base 3' from the composite 9 having undergone transfer in the transferring unit 25, and thereby produces the printed article 10. The cloth collecting unit 27 is provided on the downstream side of the releasing unit 26. The cloth collecting unit 27 collects, while winding up, the printed article 10 having undergone releasing in the releasing unit 26. The transfer paper collecting unit 28 is provided on the downstream side of the releasing unit 26, close to it. The transfer paper collecting unit 28 collects, while winding up, the used transfer paper base 3' released from the composite 9 in the releasing unit 26.

With the transfer-printing method according to the present disclosure, an ink layer 5 is formed on a transfer paper base 3' with an ink-jet head 1. Thus, even if the image formed by the ink-jet head 1 is inappropriate, expensive cloth 7 does not have to be scrapped. Moreover, compared with a case where the image is formed directly on the cloth 7 with the ink-jet head 1, the distance between the ink-jet head 1 and the transfer paper base 3' can be set to be shorter. This allows production of transfer paper 3 having an image printed on it with high quality.

Moreover, printing is possible on various kinds of cloth 7 other than polyester, and the pigment can be fixed near the surface of the cloth 7. This allows production of printed articles with sharper images than ever, and the produced printed articles show excellent fastness. Furthermore, no preprocessing or postprocessing of the cloth 7 is required, and no waste is produced other than the used transfer paper base 3'. Thus, a printing method that poses little burden on the environment and that boasts a wide scope of application is provided. The effects of the present disclosure will be described more specifically below by way of examples.

EXAMPLES I

Preparing Dispersion of Pigment: 20% by mass of a phthalocyanine pigment (Pigment Blue 15:3), 5% by mass of a styrene-acrylic resin (with a molecular weight of 5000) as a dispersion stabilizer, and 75% by mass of ion-exchanged water were blended. The blend was then subjected to high-speed dispersion on a thin-film spin system high-speed mixer (FILMIX, manufactured by PRIMIX Corporation), and was then subjected to dispersion on a beads mill (DYNO-MILL, manufactured by Shinmaru Enterprises Corporation) until the grain size was 80 nm to obtain a dispersion of the pigment. The dispersion of the pigment had a viscosity of 8 mPas.

Preparing Transfer-Printing Ink: As shown in Table 1, the previously prepared dispersion of the pigment was blended such that the pigment component was 5% by mass. Further, propylene glycol and glycerin as a water-soluble solvent and Surfynol 104 (an acetylene glycol-based surfactant, manufactured by Nissin Chemical Industry Co., Ltd.) as a surfactant were blended. Further, as a fixing resin, polyurethane latex (UPUD-ST-008, manufactured by UBE INDUSTRIES, LTD.) was blended such that its blended amount was 5% by mass, 10% by mass, and 15% by mass in solid content. Further, as a neutralizer, 0.2% by mass of dimethylaminoethanol (with a boiling point of 133° C.) was blended (the cross-linking start temperature of polyurethane latex is 140° C. or higher). Further, ion-exchanged water was blended such that the total was 100% by mass. The blend was then stirred to obtain transfer-printing inks (Practical Examples (P.Ex.) 1 to 3). As comparative examples, transfer-printing inks were prepared in which polyurethane latex was blended such that its blended amount was 3% by mass and 30% by mass (Comparative Examples (C.Ex.) 1 and 2).

Preparing Transfer-Printing Transfer Paper: The surface of transfer paper having a hydrophilic coating formed on it (Transjet, manufactured by Cham Paper Group) was sprayed with a silicone-based water repellent to obtain a transfer paper base having a coating layer in which a water-repellent releasing layer is sparsely present on the surface of a hydrophilic ink reception layer.

On the transfer paper base (in size A4) so prepared, a solid image with a density of 100% was formed on an ink-jet printer equipped with an ink-jet head (KJ4B, manufactured by KYOCERA Corporation), using the transfer-printing ink of each of Practical Examples 1 to 3 and Comparative Examples 1 and 2. The image formation speed was 50 m/s. The transfer paper base having the image formed on it was dried for 10 minutes at 60° C. to obtain transfer paper for transfer-printing.

Producing Printed Article: Cotton cloth was laid over the so prepared transfer paper, and transfer was performed for one minute at 160° C. and 1 MPa to obtain a printed article.

Evaluating Ejection Stability and Transferability of Transfer-Printing Ink, and Washing Fastness of Printed Article: The continuous ejection stability of the ink compositions was evaluated according to the following criteria:

Excellent ("Excel."): Solid-image printing on 150 A4 sheets completed with no missing dot.

Good: Solid-image printing on 150 A4 sheets completed with one or more but 10 or less missing dots.

Poor: Solid-image printing on 150 A4 sheets completed with 11 or more missing dots.

The efficiency of transfer (the ratio of transfer to cloth) was calculated by measuring the amount of ink left untransferred to the transfer paper and the amount of ink transferred to the cloth.

The washing fastness of the printed article was tested by a method conforming to ISO 105-C10:2006, and was evaluated according to the following criteria:

Excellent ("Excel."): Washing fastness of grade 4 or higher.

Good: Washing fastness of grade 3 or higher but lower than grade 4.

Poor: Washing fastness lower than grade 3.

Table 1 shows ink viscosity at 23° C., and evaluation results of ejection stability, transferability, and washing fastness of the printed article, along with the composition of transfer-printing inks ("B.P." standing for boiling point).

TABLE 1

| Ink Components | B.P. (° C.) | P. Ex. 1 | P. Ex. 2 | P. Ex. 3 | C. Ex. 1 | C. Ex. 2 |
|---|---|---|---|---|---|---|
| Pigment Blue 15:3 (Pigment Only) | | 5 | 5 | 5 | 5 | 5 |
| Propylene Glycol | 188 | 15 | 15 | 15 | 15 | 15 |
| Glycerin | 290 | 10 | 10 | 10 | 10 | 10 |
| Triaminoethanol | 133 | 0.2 | 0.2 | 0.2 | 0.2 | 0.2 |
| Surfynol 104 | | 0.5 | 0.5 | 0.5 | 0.5 | 0.5 |
| Polyurethane Latex (Solid) | | 5 | 10 | 15 | 3 | 30 |
| Ion-Exchanged Water | | Rest | Rest | Rest | Rest | Rest |
| Ink Viscosity (MPa) | | 5 | 6 | 7 | 6 | 20 |
| Ejection Stability | | Good | Good | Good | Good | Poor |
| Transfer Efficiency (Ratio of Transfer to Cloth) | | 80 | 85 | 85 | 50 | 80 |
| Washing Fastness | | Good | Excel. | Good | Poor | Good |

As Table 1 clearly indicates, with the transfer-printing inks of Practical Examples 1 to 3, in which the blended amount of polyurethane latex was 5% by mass to 15% by mass (with a mass ratio to the pigment of 1:1 to 1:3), the ink viscosity at 23° C. was in a range of 5 to 7 mPas, and continuous solid-image printing on 150 sheets of the transfer paper base resulted in 10 or less missing dots, attesting to superb ejection stability. The efficiency of transfer of the ink from transfer paper to cloth was satisfactory, at 80 to 85%, and the washing fastness of the printed article was grade 3 or higher.

In contrast, with the transfer-printing ink of Comparative Example 1, in which the blended amount of polyurethane latex was 3% by mass (with a mass ratio to the pigment of 1:0.6), the efficiency of transfer of the ink from transfer paper to cloth was as low as 50%, and the washing fastness of the printed article was less than grade 3. With the transfer-printing ink of Comparative Example 2, in which the blended amount of polyurethane latex was 30% by mass (with a mass ratio to the pigment of 1:6), the ink viscosity at 23° C. was as high as 20 mPas, and continuous solid-image printing on 150 sheets of the transfer paper base resulted in 11 or more missing dots, attesting to insufficient ejection stability.

EXAMPLES II

Preparing Water-Insoluble Polymer Solution: A reaction vessel was subjected to nitrogen gas displacement, and was then loaded with the monomers, solvent, and polymerization initiator shown in Table 2, which were then mixed together to obtain an initial monomer solution and a dropping monomer solution.

TABLE 2

| | | Initial Monomer Solution | Dropped Monomer Solution |
|---|---|---|---|
| Monomer | Methacrylic Acid | 0 | 70 |
| | Stearyl Methacrylate | 5 | 30 |
| | 2-Ethylhexyl Methacrylate | 3 | 8 |
| | Benzyl Methacrylate | 30 | 200 |
| | Styrene Monomer | 15 | 100 |
| | Polypropylene Glycol Monomethacrylate | 15 | 50 |
| Solvent | Methyl Isobutyl Ketone | 30 | 200 |
| Polymerization Initiator | 2,2-Azobis(2,4-Dimethyl)valeronitrile | 0.1 | 0.5 |

In a nitrogen environment, while the initial monomer solution in the reaction vessel was stirred and kept at 75° C., the dropping monomer solution shown in Table 2 was dropped into the reaction vessel slowly over three hours. After the completion of the dropping, the mixture solution inside the reaction vessel was stirred at 75° C. for two hours. Then, a polymerization initiator solution prepared by dissolving two parts by mass of the polymerization initiator in 130 parts by mass of methyl ethyl ketone was added to the mixture solution, which was then stirred at 75° C. for one hour to be aged. Then, the reaction solution in the reaction vessel was kept at 85° C. for two hours to obtain a polymer solution. The polymer so obtained had a weight-average molecular weight of 170,000.

Preparing Dispersion of Pigment: The polymer solution prepared as described above was blended with a phthalocyanine pigment (Pigment Blue 15:3) such that the ratio of pigment to polymer was 1:0.6, 1:1, 1:2, 1:3, and 1:6. The blend was subjected to dispersion on a high-speed spin disperser (T.K. Robomix+T.K. Homodisper Model 2.5, manufactured by PRIMIX Corporation), and was then subjected to fine dispersion on a beads mill (DYNO-MILL, manufactured by Shinmaru Enterprises Corporation) to obtain a dispersion liquid in which pigment particles of 70 nm were dispersed in the polymer solution. The dispersion liquid was then subjected to phase-change emulsification in water to obtain a dispersion liquid in the form of particles dispersed with a size of 100 nm. This dispersion liquid was then further stirred under reduced pressure to eliminate the solvent to obtain a dispersion of the pigment.

Preparing Transfer-Printing Ink and Transfer-Printing Transfer Paper, and Producing Printed Article: Using the prepared dispersion of the pigment, different blends of ink as shown in Table 3 were prepared to obtain, as in Examples I, transfer-printing inks (Practical Examples 4 to 6 and Comparative Examples 3 and 4). On the transfer paper base prepared in Examples I, a solid image with a density of 100% was formed using the transfer-printing ink of each of Practical Examples 4 to 6 and Comparative Examples 3 and 4 to obtain transfer paper for transfer-printing. Cotton cloth was laid over the so prepared transfer paper for transfer-printing, and transfer was performed for one minute at 160° C. and 1 MPa to obtain a printed article.

Evaluating Ejection Stability and Transferability of Transfer-Printing Ink, and Washing Fastness of Printed Article: The continuous ejection stability and the transfer efficiency of the ink compositions and the washing fastness of the printed article were evaluated by methods, and according to criteria, similar to those for Examples I. Table 3 shows ink viscosity at 23° C., and evaluation results of ejection stability, transferability, and washing fastness of the printed article, along with the composition of transfer-printing inks ("B.P." standing for boiling point).

TABLE 3

| Ink Components | B.P. (° C.) | P. Ex. 4 | P. Ex. 5 | P. Ex. 6 | C. Ex. 3 | C. Ex. 4 |
|---|---|---|---|---|---|---|
| Pigment Blue 15:3 (Pigment Only) | | 5 | 5 | 5 | 5 | 5 |
| Styrene-Acrylic Resin Component | | 5 | 10 | 15 | 3 | 30 |
| Propylene Glycol | 188 | 15 | 15 | 15 | 15 | 15 |
| Glycerin | 290 | 10 | 10 | 10 | 10 | 10 |
| Triaminoethanol | 133 | 0.2 | 0.2 | 0.2 | 0.2 | 0.2 |
| Surfynol 104 | | 0.5 | 0.5 | 0.5 | 0.5 | 0.5 |
| Ion-Exchanged Water | | Rest | Rest | Rest | Rest | Rest |
| Ink Viscosity (MPa) | | 4 | 5 | 6 | 4 | 15 |
| Ejection Stability | | Good | Good | Good | Good | Poor |
| Transfer Efficiency (Ratio of Transfer to Cloth) | | 85 | 90 | 95 | 60 | 85 |
| Washing Fastness | | Good | Good | Good | Poor | Good |

As Table 3 clearly indicates, with the transfer-printing inks of Practical Examples 4 to 6, in which the blended amount of the styrene-acrylic resin component was 5% by mass to 15% by mass (with a mass ratio to the pigment of 1:1 to 1:3), the ink viscosity at 23° C. was in a range of 4 to 6 mPas, and continuous solid-image printing on 150 sheets of the transfer paper base resulted in 10 or less missing dots, attesting to superb ejection stability. The efficiency of transfer of the ink from transfer paper to cloth was satisfactory, at 85 to 95%, and the washing fastness of the printed article was grade 3 or higher.

In contrast, with the transfer-printing ink of Comparative Example 3, in which the blended amount of the styrene-acrylic resin component was 3% (with a mass ratio to the pigment of 1:0.6), the efficiency of transfer of the ink from transfer paper to cloth was as low as 60%, and the washing fastness of the printed article was lower than grade 3. With the transfer-printing ink of Comparative Example 4, in which the blended amount of the styrene-acrylic resin component was 30% (with a mass ratio to the pigment of 1:6), the ink viscosity at 23° C. was as high as 15 mPas, and continuous solid-image printing on 150 sheets of the transfer paper base resulted in 11 or more missing dots, attesting to insufficient ejection stability.

The results with Examples I and II confirm the following: by blending 5% by mass to 15% by mass of a polyurethane latex or styrene-acrylic resin component as a fixing resin, it is possible to obtain transfer-printing ink that exhibits superb ejection stability when preparing transfer paper on an ink-jet printer; it is then possible to obtain high transfer efficiency when transferring an image from transfer paper to cloth, and to produce a printed article with superb washing fastness.

The present disclosure finds application in transfer-printing ink that is ejected onto transfer paper by an ink-jet recording device and that is then transferred to a recording sheet. According to the present disclosure, it is possible to provide transfer-printing inks and transfer-printing apparatuses that allow easy and high-quality printing of images on recording sheets of materials with pigment ink and that do not require preprocessing or postprocessing of recording sheets.

What is claimed is:

1. A transfer-printing ink comprising:
   a pigment; and
   a fixing resin
   wherein
   a mass ratio of the pigment to the fixing resin is 1:1 to 1:5,
   the ink has a viscosity of 3 mPas to 10 mPas at 23° C., and
   the ink is ejected onto a transfer paper base by an ink-jet recording device when transfer paper is prepared, the ink then being transferred from the transfer paper to cloth as a result of the transfer paper, with the cloth laid thereover, being heated,
   the fixing resin is anionic, and
   the ink further comprises a volatile amine for neutralizing the fixing resin.

2. The transfer-printing ink according to claim 1, wherein the fixing resin is a water-dispersible resin and is present as a coating material around particles of the pigment.

3. The transfer-printing ink according to claim 1, wherein the fixing resin is a water-dispersible resin and forms an emulsion as latex particles.

4. The transfer-printing ink according to claim 2, wherein the water-dispersible resin is one, or two or more, selected from the group consisting of styrene-acrylic resin, silicone resin, polyester resin, polyurethane resin, a copolymer of styrene-acrylic resin with polyester resin, and a copolymer of styrene-acrylic resin with urethane resin.

5. The transfer-printing ink according to claim 1, wherein a boiling point of the volatile amine is 50° C. or higher but 250° C. or lower at ordinary pressure.

6. The transfer-printing ink according to claim 5, wherein the volatile amine is one, or two or more, selected from the group consisting of triethylamine, 2-dimethylaminoethanol, 2-di-n-butylaminoethanol; methyldiethanolamine, 2-amino-2-methyl-1-propanol, diethanolamine; triethanolamine, and 2-methylaminoethanol.

7. The transfer-printing ink according to claim 1, wherein a cross-linking temperature of the fixing resin is 100° C. or higher but 200° C. or lower.

8. A transfer-printing apparatus comprising:
   an ink-jet recording unit which forms on a transfer paper base an image using transfer-printing ink containing a pigment, an anionic fixing resin, and a volatile amine for neutralizing the fixing resin; thereby to obtain transfer paper;
   a drying unit which dries; at a temperature lower than a cross-linking temperature of the fixing resin; the transfer paper having the image formed thereon by the ink-jet recording unit;
   a transferring unit which transfers the image formed on the transfer paper to cloth by pressing, while heating at a temperature higher than the cross-linking temperature of the fixing resin, the transfer paper dried by the drying unit with the cloth laid thereover; and a releasing unit which releases the transfer paper base from a composite of the transfer paper and the cloth laid together that has passed through the transferring unit.

* * * * *